(12) United States Patent
Riihioja

(10) Patent No.: US 11,952,452 B2
(45) Date of Patent: Apr. 9, 2024

(54) MODIFIED POLYURETHANE BELT FOR A PAPER, BOARD, PULP OR TISSUE MACHINE AND PROCESS OF PRODUCING THEREOF

(71) Applicant: Valmet Technologies Oy, Espoo (FI)

(72) Inventor: Vesa-Matti Riihioja, Tampere (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 17/956,350

(22) Filed: Sep. 29, 2022

(65) Prior Publication Data
US 2023/0097651 A1 Mar. 30, 2023

(30) Foreign Application Priority Data
Sep. 30, 2021 (FI) .................... 20216016

(51) Int. Cl.
*C08F 283/00* (2006.01)
(52) U.S. Cl.
CPC .................. *C08F 283/006* (2013.01)

(58) Field of Classification Search
CPC ................................. C08F 283/00
See application file for complete search history.

(56) References Cited

FOREIGN PATENT DOCUMENTS

| CN | 102686629 A | * | 9/2012 | ............ C08G 18/48 |
|---|---|---|---|---|
| CN | 215556405 U | * | 1/2022 | |

* cited by examiner

*Primary Examiner* — Robert D Harlan
(74) *Attorney, Agent, or Firm* — Stiennon & Stiennon

(57) ABSTRACT

A process produces a body of a belt (10) for a paper, board, pulp or tissue machine, the body having an inner surface and an outer surface. The process includes producing a modified polyurethane by adding a polydialkylsiloxane having at least one functional group to a manufacturing process of a polyurethane in order to obtain the modified polyurethane, which modified polyurethane is a polyurethane matrix having a covalent bond with the polydialkylsiloxane, and forming the body of the belt, wherein the body is the modified polyurethane. The belt (10) is for a paper, board, pulp, or tissue machine, or for a shoe press and a sleeve roll.

13 Claims, 3 Drawing Sheets

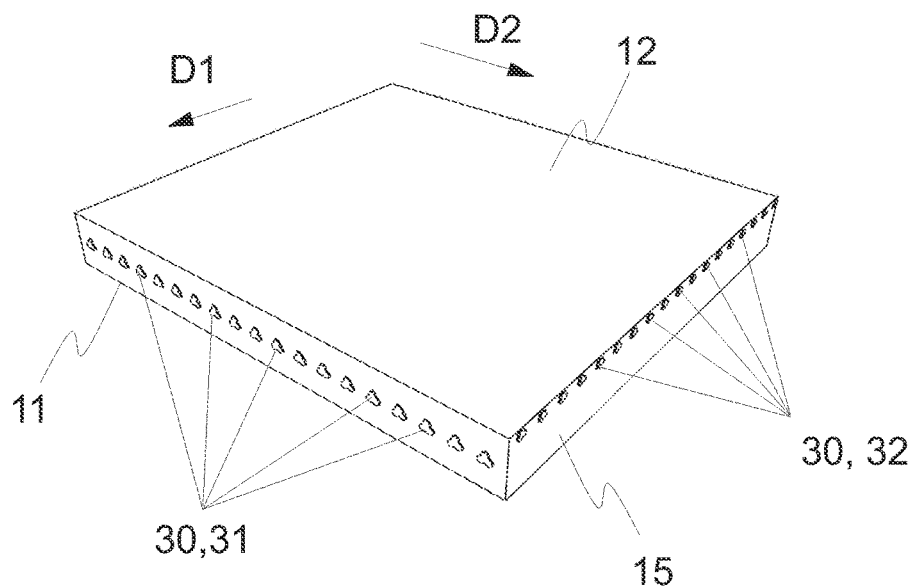
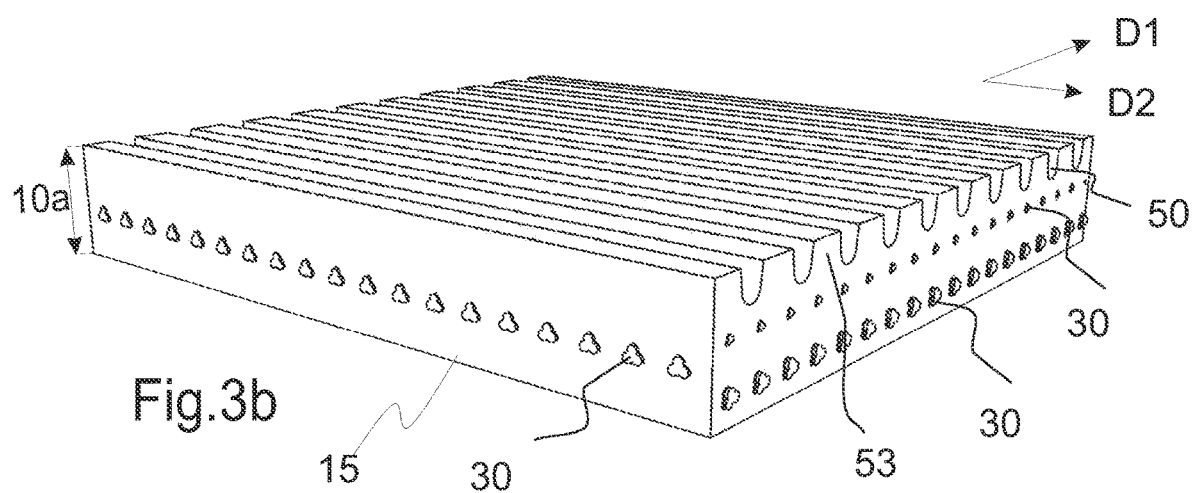
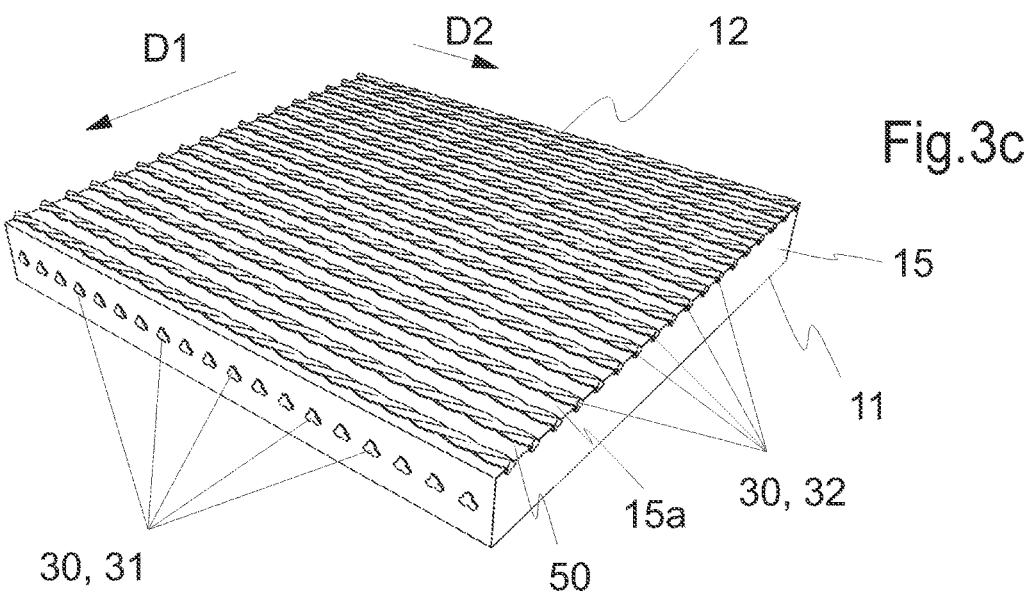

MODIFIED POLYURETHANE BELT FOR A PAPER, BOARD, PULP OR TISSUE MACHINE AND PROCESS OF PRODUCING THEREOF

CROSS REFERENCES TO RELATED APPLICATIONS

This application claims priority on Finnish App. No. FI 20216016, filed Sep. 30, 2021, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention relates to a process for producing a body of a belt for a paper, board, pulp, or tissue machine. This invention further relates to a belt for a paper, board, pulp, or tissue machine.

Paper machines, as well as board, pulp, and tissue machines, are typically equipped with a forming section, a press section, and a drying section. In paper, pulp and board making, it is an issue how to increase the dewatering amount from a wet fiber web in order to improve the production efficiency.

Nowadays, these machines typically have felts and wires to remove water from the fiber web. Water can be removed e.g., on the forming section through at least one forming wire, and on the press section e.g., by using felts.

A sleeve roll can be used e.g., in forming sections to improve dewatering from the wet fiber web. A shoe press can be used, for example, in press sections to improve dewatering therein.

SUMMARY OF THE INVENTION

The present invention relates to a belt for a paper, board, pulp, or tissue machine. One object of the present invention is to provide an improved belt.

Aspects of the invention are characterized by a process for producing a body of a belt which comprises a polyurethane matrix having a covalent bond with the polydialkylsiloxane.

A paper, board, pulp, or tissue machine may comprise a sleeve roll. The sleeve roll is typically located at a wire section of a paper, board, pulp, or tissue machine. Thanks to the sleeve roll, moisture removal of the wire section can be improved.

Alternatively, or in addition, a paper, board, pulp, or tissue machine may comprise one or more than one shoe press. The shoe press is typically located at a press section of a paper, board, pulp, or tissue machine. Thanks to the shoe press, moisture removal of the press sections can be improved.

Therefore, a paper, board, pulp, or tissue machine may comprise at least one sleeve roll and/or at least one shoe press. The novel belt may be a belt for a sleeve roll, or a belt for a shoe press.

The belt comprises a body comprising an inner surface and an outer surface. Further, the belt may comprise a reinforcing structure, which may be e.g. embedded into the body. The belt may form a closed loop.

The novel belt comprises a modified polyurethane, the modified polyurethane comprising a polyurethane matrix having a covalent bond with a polydialkylsiloxane.

Advantageously, the body comprises an outer layer forming the outer surface of the body, the outer layer having a thickness of at least 0.5 mm, preferably at least 1 mm, and most preferably at least 1.5 mm, wherein the outer layer of the body comprises the modified polyurethane. The technical effect is that the belt is able to reduce friction even after the outer surface of the belt starts to wear. With the higher thickness of at least 1 mm, preferably a least 1.5 mm, the belt is suitable for reducing wear of the belt longer during usage of the belt.

A process for producing a body of a belt for a paper, board, pulp, or tissue machine may comprise the following steps:
  producing a modified polyurethane
  by adding a polydialkylsiloxane having at least one functional group to a manufacturing process of a polyurethane in order to obtain the modified polyurethane, which modified polyurethane comprises a polyurethane matrix having a covalent bond with the polydialkylsiloxane, and
    forming the body of the belt, the body comprising an outer layer forming the outer surface of the body, the outer layer having a thickness of at least 0.5 mm, wherein the outer layer of the body comprises the modified polyurethane.

The alkyl groups of the polydialkylsiloxane may contain 1 to 4 carbon atoms, preferably 1 to 3 carbon atoms. Advantageously, the polydialkylsiloxane is a polydimethylsiloxane. Thus, easiness of the manufacturing process can be improved. Further, thanks to the polydimethylsiloxane, some properties of the modified polyurethane can be improved.

Thanks to the polydialkylsiloxane, such as polydimethylsiloxane, having at least one functional group able to react with an isocyanate (—NCO) group during the manufacturing process of a polyurethane, it is possible to obtain a modified polyurethane having improved properties. Because the polydialkylsiloxane has a covalent bond with a polyurethane matrix, the polydialkylsiloxane content of the modified polyurethane may be the same or substantially the same through the whole modified polyurethane material. Thus, a layer of a belt comprising the modified polyurethane can have the same or substantially the same polydialkylsiloxane content through said layer. Therefore, the friction level of the outer surface of the belt can be controlled.

The polydialkylsiloxane having at least one functional group can be based on a linear siloxane chain.

In an embodiment, the polydialkylsiloxane having at least one functional group may be selected from a group consisting of
  hydroxy terminated polydimethylsiloxanes, and
  amino-terminated polydimethylsiloxanes.

The polydialkylsiloxane having at least one functional group may have the following structure:

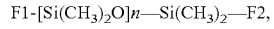

F1-[Si(CH$_3$)$_2$O]$n$—Si(CH$_3$)$_2$—F2, wherein n is a number of repeating Si(CH$_3$)$_2$O units, and at least one of F1 and F2 comprises or consists of a functional group.

In an embodiment, the polydialkylsiloxane having at least one functional group is an aminopropyl terminated polydimethylsiloxane. In an embodiment, the polydialkylsiloxane having at least one functional group is a carbinol hydroxy terminated polydimethylsiloxane. In an embodiment, the polydialkylsiloxane having at least one functional group is an aminomethyl-terminated polydimethylsiloxane.

Thus, the polydialkylsiloxane having at least one functional group may comprise the structure of

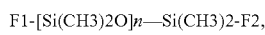
F1-[Si(CH3)2O]n—Si(CH3)2-F2, wherein F1 may comprise NCO, or OH or NH$_2$, and F2 may comprise NCO or OH or NH$_2$ or H.

The at least one functional group of the polydialkylsiloxane typically reacts with isocyanate (—NCO) group in order to form the modified polyurethane. If the at least one functional group of the polydialkylsiloxane comprises NCO, the produced modified polyurethane may have some poorer properties than if the at least one functional group comprises OH or NH$_2$. Therefore, preferably, F1 is OH or NH$_2$, and F2 is OH or NH$_2$ or H.

Hydroxy terminated polydimethylsiloxanes, and amino-terminated polydimethylsiloxanes has e.g., different reaction rates, i.e., the speed at which the chemical reaction proceeds, which can cause different properties for the modified polyurethane. Thus, most preferably, F1 comprises OH, and F2 is hydrogen or comprises OH.

The terminating group of the polydialkylsiloxane may have an increased length. Therefore, F1 may be, for example, —R1-OH, —R1-NH$_2$, or —OH, or —NH$_2$, wherein R1 may be (CH2)m. Number m of repeating units (CH2) may be in a range between 1 and 3. Alternatively, or in addition, F2 may be, for example, —R1-OH, —R1-NH$_2$, or —OH, or —NH$_2$, wherein R1 may comprise (CH2)p, and number p of repeating units may be in a range between 1 and 3. Some properties of the modified polyurethane may change when the length of the terminating group increases. Thus, in this embodiment, said numbers are preferably equal to or less than 3.

In an embodiment, the polydialkylsiloxane having at least one functional group is an amino terminated polydimethylsiloxane. In this embodiment, a fraction of NH$_2$-groups in the amino terminated polydimethylsiloxane is preferably in a range between 0.2 mol-% and 4 mol-%, more preferably in a range between 1 mol-% and 2 mol-%. Said fraction can be suitable to obtain a modified polyurethane having predetermined friction properties.

In a preferred embodiment, the polydialkylsiloxane having at least one functional group is a hydroxy terminated polydimethylsiloxane. In this embodiment, a fraction of OH-groups in the hydroxy terminated polydimethylsiloxane is preferably in a range between 0.2 mol-% and 4 mol-%, more preferably in a range between 1 mol-% and 2 mol-%. Said fraction can be suitable to obtain a modified polyurethane having improved friction properties.

The polydialkylsiloxane having at least one functional group, as well as the polydialkylsiloxane chain in the modified polyurethane, can have the following repeating unit:

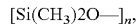
[Si(CH$_3$)2O—]$_n$, wherein n is a number of repeating Si(CH$_3$)$_2$O— units.

Said number n of the repeating Si(CH$_3$)$_2$O— units may preferably be in a range between 30 and 200, more preferably in a range between 50 and 150, and most preferably in a range between 60 and 120. Thanks to said number of the repeating units, properties of the modified polyurethane can be improved. Furthermore, easiness of the manufacturing process can be improved. However, in an embodiment, The number of the repeating can be at least 5, and less than 500.

A viscosity of the polydialkylsiloxane, such as polydimethylsiloxane, having at least one functional group, which is added to the manufacturing process of a polyurethane, may be in a range between 20 cst. and 750 cst., preferably in a range between 50 cst and 400 cst., more preferably in a range between 70 cst and 250 cst and most preferably in a range between 80 cst and 180 cst. Thus, the polydialkylsiloxane may be easily mixed with other raw materials of the modified polyurethane in order to allow the functional groups of the polydialkylsiloxane to react with NCO-groups therein, thereby obtaining the modified polyurethane.

The belt comprises a body comprising an inner surface and an outer surface. The body of the belt comprises an outer layer of the body forming the outer surface of the body. The outer layer of the body may have a thickness of equal to or less than a thickness of the body of the belt. Said outer layer comprises the modified polyurethane having a polyurethane matrix which has a covalent bond with the polydialkylsiloxane.

The polydialkylsiloxane, such as the polydimethylsiloxane, may have a molecular weight (MW) from about 1500 g/mol to 8000 g/mol, more preferably from 1600 g/mol to 6000 g/mol, and most preferably in a range between 1700 g/mol and 5000 g/mol. By using polydialkylsiloxane having said molecular weight, easiness of the manufacturing process can be improved and, hence, the product can have an improved quality.

The amount of the polydialkylsiloxane in the modified polyurethane may be in a range between 0.5 wt. %-3 wt. %, preferably in a range between 0.8 wt. % and 2.5 wt. % determined from the weight of the modified polyurethane material. Further, an amount of the polydialkylsiloxane in the outer layer of the body of the belt may be in a range between 0.5 wt. %-3 wt. %, preferably in a range between 1 wt. % and 2.5 wt. %, determined from the total weight of the outer layer. Thus, friction between the belt and a wire/felt can be reduced cost-efficiently.

As discussed, at least the outer layer of the belt comprises the modified polyurethane. The outer layer comprising the modified polyurethane has a thickness of equal to or more than 0.5 mm, preferably equal to or more than 1.0 mm, and more preferably equal to or more than 1.5 mm, determined as a depth from the outer surface of the belt. Thus, the outer layer may have a suitable thickness to be able to reduce friction. Thanks to the higher thickness of at least 0.5 mm, preferably at least 1 mm, the belt is able to reduce friction after the outer surface of the belt starts to wear. The outer layer of the body comprising the modified polyurethane may have a thickness of equal to or less than a thickness of the body, preferably equal to or less than 4 mm, and more preferably equal to or less than 3 mm, determined as a depth from the outer surface of the belt. Preferably, the outer layer has thickness in a range between 0.5 mm and 3 mm, more preferably in a range between 1 mm and 2.5 mm, determined as a depth from the outer surface of the belt.

The outer surface of the body of the belt may be smooth. Thus, the belt may have a smooth outer surface. The modified polyurethane can have the greatest effect on the friction properties of the belt if the belt has said smooth, or substantially smooth, outer surface.

The body of the belt may further comprise an inner layer. In this embodiment, the thickness of the outer layer of the body is less than the thickness of the body, and the inner layer forms the inner surface of the body. A thickness of the inner layer is less than the thickness of the body of the belt. The inner layer can be free of the polydialkylsiloxane. This can reduce manufacturing costs of the belt. However, in an embodiment, the inner layer comprises polydialkylsiloxane.

The body of the belt comprises at least said outer layer. The body of the belt may further comprise said inner layer. Furthermore, the body of the belt may comprise one or more layers between the inner layer and the outer layer. Said layer(s) between the inner layer and the outer layer, if used, may not comprise the modified polyurethane. This may reduce manufacturing costs of the belt without affecting substantially other properties of the belt. However, in an embodiment, the belt comprises the inner layer and the outer layer and one or more layers between the inner layer and the outer layer, wherein at least one layer between the inner layer and the outer layer comprises the modified polyurethane.

Thanks to the novel solution, wear of the belt, as well as wear of a wire or felt in contact with the belt, can be reduced.

BRIEF DESCRIPTION OF THE DRAWINGS

In the following, the invention will be illustrated by the drawings.

FIGS. 3A-3C illustrate some example structures of belts.

The figures are illustrations which may not be in scale. Similar parts are indicated in the figures by the same reference numbers.

DESCRIPTION OF THE PREFERRED EMBODIMENTS

Figure 1A:
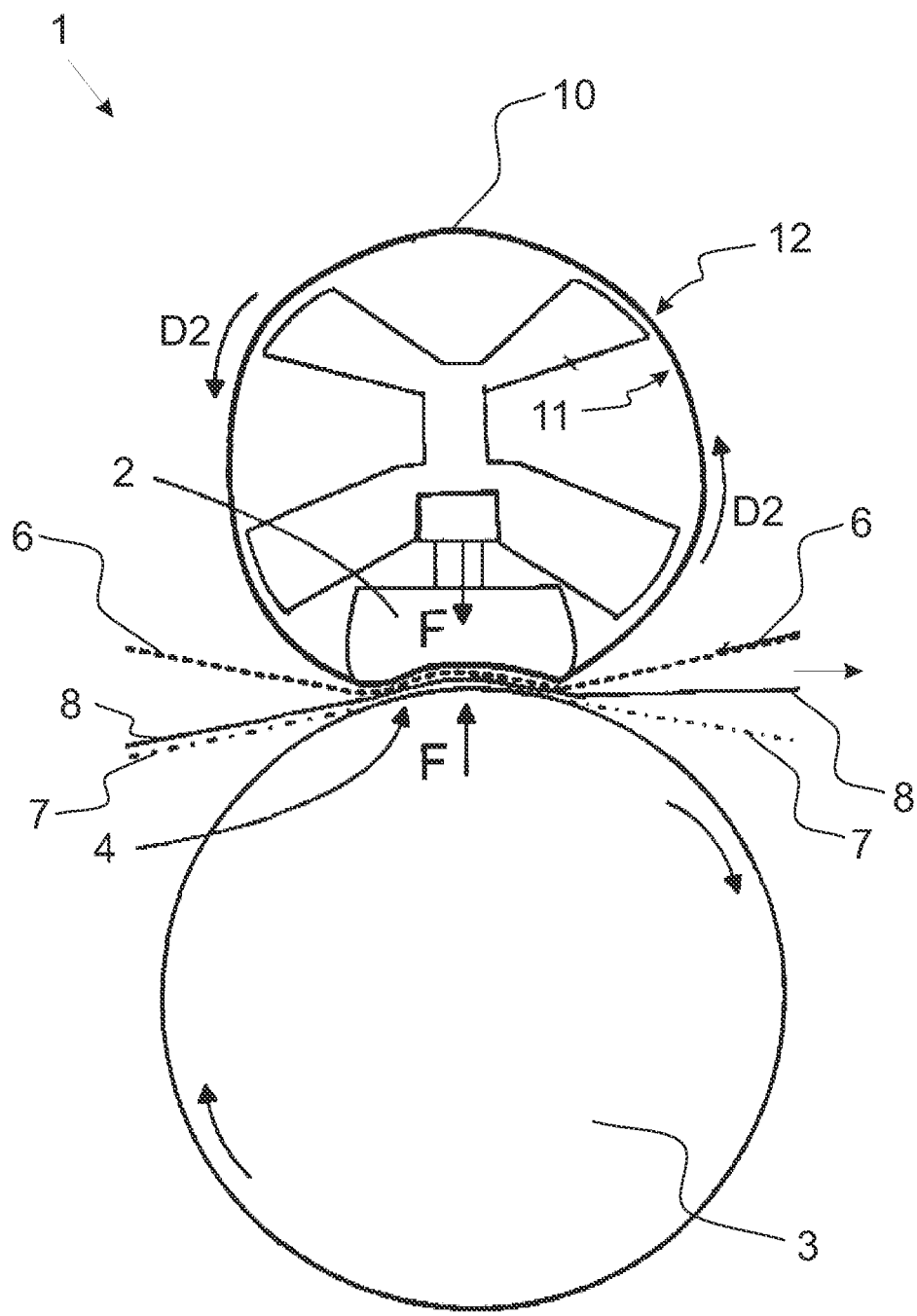
FIG. 1A illustrates an example of a shoe press.

All embodiments in this application are presented as illustrative examples, and they should not be considered limiting.

In this application, the term "modified polyurethane" may refer to a material comprising a polyurethane matrix which has a covalent bond with a polydialkylsiloxane, such as a polydimethylsiloxane.

In this application, the term "PDMS" refers to a polydimethylsiloxane.

The term "PDMS-F1" refers to a polydimethylsiloxane having at least one functional group. Said at least one functional group may comprise, for example, OH, $NH_2$ or NCO, more preferably OH or $NH_2$, and most preferably OH.

The term "PDMS-OH" refers to a hydroxy terminated polydimethylsiloxane.

The PDMS, as well as the PDMS-F1, may be based on a linear siloxane chain.

In this application, the term "outer layer of the body of the belt" refers to a layer comprising modified polyurethane comprising Polydialkylsiloxane. The polydialkylsiloxane can have a covalent bond with a polyurethane matrix. Said outer layer extends from an outer surface of the body to a depth direction of the belt. A thickness of the outer layer of the body of the belt may be equal to or less than a thickness of the body of the belt.

In this application, the terms "travel direction" MD and "cross direction" CD are used.

The travel direction MD refers to the direction of rotation of the belt in use. Further, the term "second direction" D2 can refer to a direction parallel or substantially parallel to the travel direction of the belt.

The cross-direction CD refers to the longitudinal direction, typically transverse to the travel direction MD of the belt 10. In use, the cross-direction is parallel to the axis of rotation of the belt. In this application, the term "first direction" D1 can refer to a direction parallel or substantially parallel to the cross direction of the belt.

In this application, the term "substantially parallel" means that one direction does not deviate from said substantially parallel direction by more than 10 degrees, most preferably not by more than 3 degrees. Thus, e.g. "substantially parallel to the travel direction" means, in this application, that a direction does not deviate from said travel direction by more than 10 degrees, and preferably not by more than 3 degrees.

The term thickness of the belt will be used, referring to the depth direction of the belt. Furthermore, thickness of the body refers to the depth direction of the body of the belt.

Paper, Board, Pulp, and Tissue Machines

Typically, in paper, board, pulp and tissue machines, the fiber web is produced and treated in an assembly formed by several apparatuses arranged consecutively in a process line.

A typical production line comprises a forming section comprising a headbox and a wire, a press section comprising a felt, a drying section and, finally, a reel-up. Further, the production line typically comprises e.g., at least one winder for forming customer rolls.

In the forming section, a headbox is used to form the fiber web. Further, some water can be removed through at least one paper machine fabric, i.e., at least one forming wire. The water removal rate may be improved by using a sleeve roll comprising a belt.

In the press section, some of the water remaining after the forming section can be removed by using at least one paper machine fabric, i.e., a felt. The water removal rate may be improved by using a shoe press 1 comprising a belt.

Shoe Press

FIG. 1A illustrates an example of a shoe press.

Shoe presses 1 may be used in a paper, board, pulp, or tissue machine. FIG. 1A shows a reduced view of the arrangement of a shoe press belt 10 in a shoe press 1.

The shoe press 1 equipped with the shoe press belt 10 can be used for dewatering a fiber web 8. The shoe press 1 typically comprises a counter roll 3 and a press shoe 2, a press zone 4 being formed between them. Thus, an extended press zone, i.e., a so-called long nip, is formed between the press shoe 2 and the counter roll 3. The function of the shoe press 1 is typically to remove water from the fiber web 8.

The shoe press belt 10, at least one paper machine fabric 6, 7, preferably two paper machine fabrics 6, 7, and the fiber web 8 to be dewatered, are arranged to be run through the press zone 4 in the travel direction (MD). Said fiber web 8 is thus supported by at least one paper machine fabric 6, 7, such as a felt and/or a wire.

The shoe press belt 10 is or can be arranged in connection with the shoe press 1 in such a way that its outer surface 12 faces the fiber web 8 and its inner surface 11 faces the press shoe 2. One surface of the wet fiber web 8 is typically compressed by the rotating counter roll 3 while the other surface of the fiber web 8 is compressed by the press shoe 2 which is encircled by the shoe press belt 10 having a flexible body and the shape of a loop.

In operation, the shoe press belt 10 typically runs through the press zone 4 between at least one counter roll 3 and the press shoe 2. Advantageously, a paper machine fabric 6, preferably a press felt, is fitted, or is configured to be fitted, against the shoe press belt 10. On top of the press felt or corresponding paper machine fabric 6, 7, the fiber web 8 is conveyed through the shoe press 1 so that the outer surface 12 of the shoe press belt 10 is in direct contact with the paper machine fabric 6, preferably press felt, and the inner surface 11 of the shoe press belt 10 slides against the sliding surface of the press shoe 2.

Typically, the press shoe 2 and the counter roll 3 are pressed against each other in the press zone in such a way that the shoe press belt 10, at least one paper machine fabric 6, 7 and the fiber web 8 to be dewatered, all run in the nip between the press shoe 2 and the counter roll 3, are compressed. For example, the press felt is typically configured to be compressed in the press zone and to substantially reassume its initial thickness after the compression.

Sleeve Roll

Figure 1B:
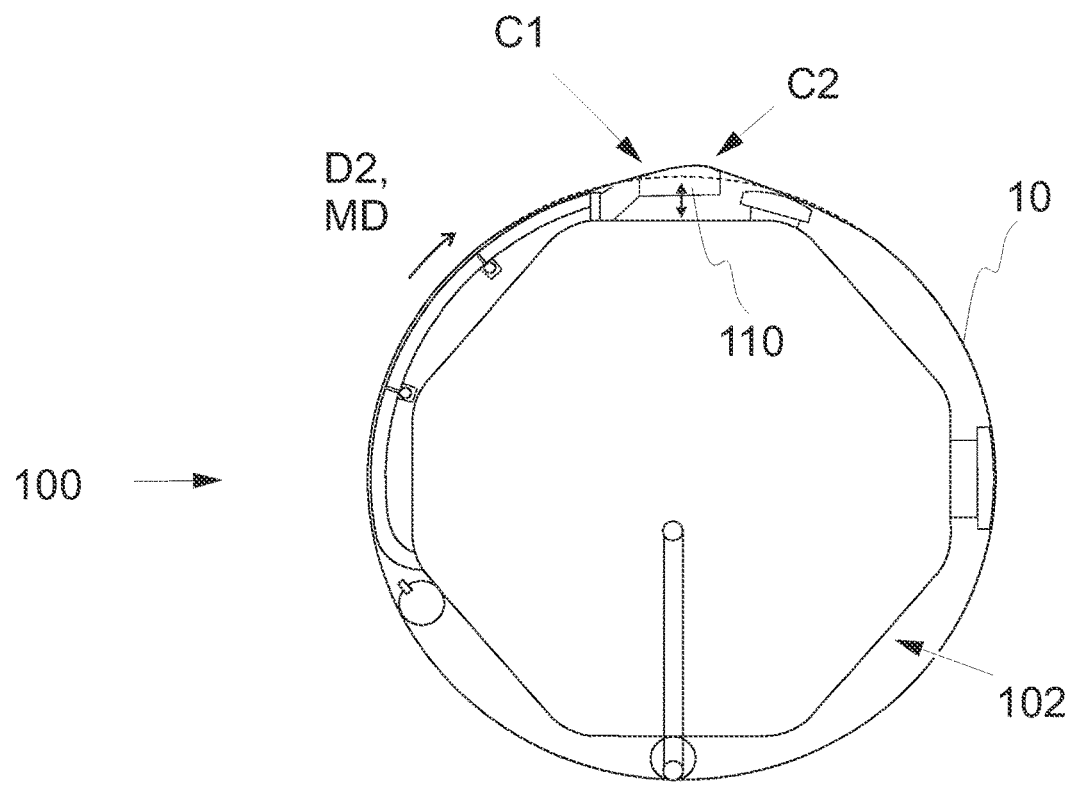
FIG. 1B illustrates an example of a sleeve roll.
Figure 2:
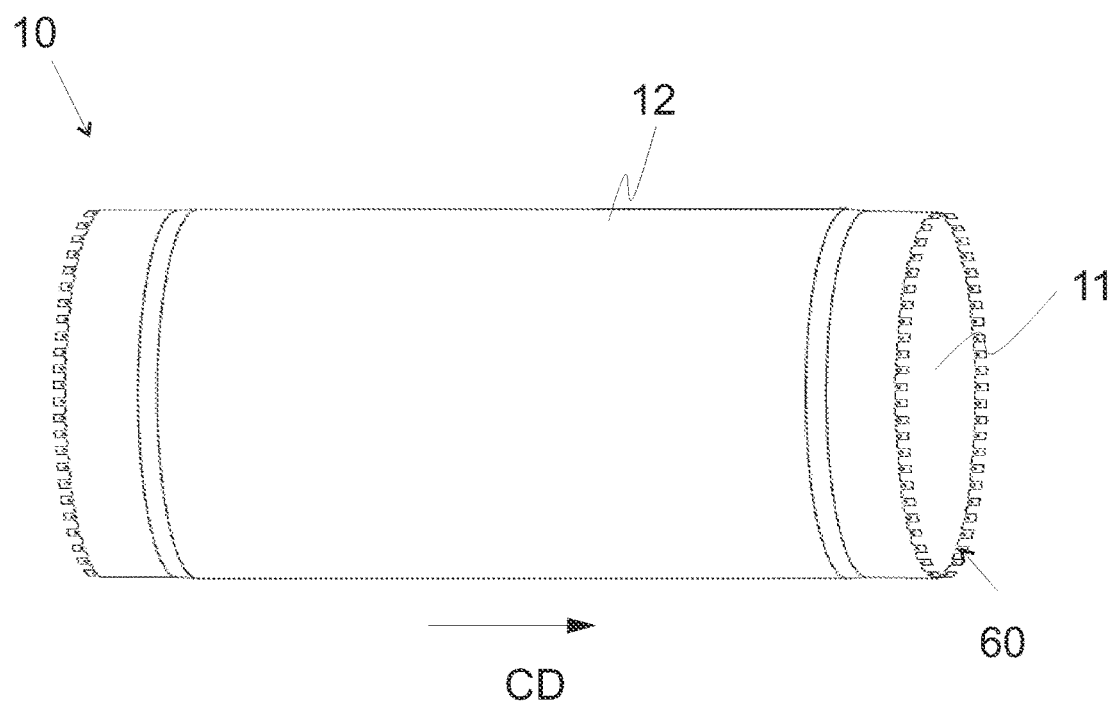
FIG. 2 illustrates an example of a belt.

FIG. 1B illustrates an example of a sleeve roll.

The sleeve roll 100 can be located in the forming section for improving water removal therein. The sleeve roll 100 can be located e.g., in a bottom layer wire loop. The sleeve roll may be used e.g., for joining layers of a multi-ply fiber web in a sleeve roll nip between the sleeve roll and the opposite wire of a twin-wire forming part. The belt 10 may be arranged on a sleeve roll 100 which can be located e.g., at a wire section of a paper, board, pulp, or tissue machine.

The sleeve roll 100 can comprise a support shaft 102. The sleeve roll further comprises the belt 10 which is typically located around an outer surface the sleeve roll 100. The belt 10 can be led to circle around the support shaft 102.

Still further, the sleeve roll 100 can comprise support elements located at a distance from each other on the support shaft 102. The belt 10, which can circle around the outer surface of the sleeve roll, can be supported by the support elements.

The sleeve roll 100 can further comprise a curve element 110. In operation, the belt typically runs through the dewatering zone on the curve element. The curve element 110 can cause increased forces which stretch the belt on the curve element 110. The curve element 110 may be movable, i.e., a radius of curvature of the belt on the on the surface of the curve element 110 can be controlled by moving the curve element 110 towards the center of the sleeve roll or outward from the outer surface of the sleeve roll. Thus, stretching of the belt 10 may vary from a normal rate to a very high rate.

The belt 10 may be arranged in connection with the sleeve roll 100 in such a way that its outer surface 12 faces the fiber web and its inner surface 11 faces the sleeve roll. Thus, the sleeve roll 100 can be encircled by the belt 10 having the shape of a loop.

A circumference of the belt may be increased and decreased during operating hours of the belt due to the movable curve element 110. Therefore, the belt may have high elasticity in order to be able to handle the stretching caused by the curve element 110 of the sleeve roll. Further, the belt may have good strength properties so that it does not break easily.

The belt 10 may be led to circle around the stationary support shaft 102. Further, wire(s) can be led via the curvilinear dewatering zone C1, C2, which dewatering zone can be supported by the belt 10.

The sleeve roll 100 can comprise at least one curvilinear dewatering zone C1, C2 comprising typically at least two partial curves C1, C2 such that the radius of curvature of a first partial curve C1 may be greater than the radius of curvature of a second partial curve C2 following the first partial curve in the travel direction MD of the belt. This can improve the water removal from the fiber web.

The curvilinear dewatering zone C1, C2 may be formed by the curve element 110 of the sleeve roll 100. The degree of curvature of the curve element 110 can increase in the travel direction of the belt 10 such that increasing dewatering pressure is applied to the fiber web travelling between the wires on said at least one curvilinear dewatering zone C1, C2 on the curve element 110. The curvilinear dewatering zone C1, C2 on the curve element 110 may contain several curves such that the radius of curvatures preferably decreases in the running direction of the wires. This can improve the water removal from the fiber web.

The sleeve roll 100 can comprise lubricant between the inner surface 11 of the belt 10 and the outer surface of the sleeve roll 100. Thus, the sleeve roll can comprise e.g. a lubricating pump(s), which can be used to pump lubricant into a gap between said belt 10 and the outer surface of the sleeve roll.

The curve element 110 may be moved between two or more than two positions. Therefore, the curve element 110 may be used for controlling the radius of curvature of the belt 10 on the curve element 110.

The first position of the curve element 110 may form a first surface on the curve element. The first surface may have the same radius of curvature as the surface near the curve element.

In the second position of the curve element 110, an outer surface of the curve element may be moved outward. Thus, the second position of the curve element 110 may form a second surface on the curve element. The second surface may have decreased radius of curvature, if compared to surfaces near the curve element.

In the second position of the curve element 110, the belt 10 may need to stretch due to the curve element 110. Further, if the curve element 100 is movable, the belt 10 may need to return to its original shape when the curve element is moved back to the first position. Thus, the belt 10 may need to have good elasticity as well as suitable strength properties.

As discussed above, the belt 10 can be arranged to run around the sleeve roll 100. The inner surface 11 of the belt 10 can slide against the outer surface of the sleeve roll 100. A fiber web to be treated can be led to the belt 10, typically supported by one or more than one fabric, such as a wire.

Belt

The term "belt" refers to a belt which is suitable for a sleeve roll and/or a shoe press of a paper, board, pulp, or tissue machine.

The belt 10 is typically shaped like an endless loop. The belt 10 has a length, a circumference, and a thickness. The thickness is the smallest dimension. The circumference and the length can be selected for adapting the belt to a sleeve roll 100 or to a shoe press 1. The circumference of the belt 10 is determined to be such that the inner diameter of the belt 10, when in operation, will be suitable for the purpose. The belt 10 can be an impermeable belt.

The belt comprises an inner surface, and an outer surface. The belt may comprise a reinforcing structure. The belt may form a closed loop.

The belt has a body of the belt. The body can comprise an inner surface of the body and an outer surface of the body. The inner surface of the body may form the inner surface of the belt. The outer surface of the body may form the outer surface of the belt, or at least part of the outer surface of the belt.

In this application, the term "elasticity" refers to an ability of the belt to return to its original shape when a force is removed. Elasticity percentages (%) are values stating how much the belt can stretch elastically.

The belt may be configured to stretch elastically equal to or more than 1.5% in the travel direction of the belt so that it will return in its original length after the force stretching the belt has been removed. In an embodiment, the belt can be configured to stretch elastically in a range between 1.5% and at least 5.0%, more preferably from 2.0% to 4.0%, in the travel direction of the belt so that it will return in its original length after the force stretching the belt has been removed. Thus, the belt may have good stretchability and elasticity, at least in the travel direction of the belt. Thus, the belt may not be easily damaged. The belt 10 may further be bendable, i.e., the belt can be capable of being bent at least to a predetermined radius of curvature without breaking.

The length of the belt in the cross direction is determined according to the machine width and may be, for example, in a range between 1.5 m and 12.6 m.

The circumference of the belt 10, that is the length of one rotation, is determined to be such that the inner diameter of the belt 10, when in operation, will be suitable for the use. Circumferences of sleeve roll belts and shoe press belts may differ. An inner diameter of the belt may be in a range between 0.7 m and 6.3 m. In an embodiment, the inner diameter of the belt 10 is 0.7 to 2.5 m, more preferably 1.0 to 1.9 m, and most preferably 1.09 to 1.82 m. In another embodiment, the circumference of the belt 10 is at least 2.2 m, more advantageously at least 3.0 m, and preferably at least 3.4 m. Furthermore, in this embodiment, the circumference of the belt is suitably not greater than 6.3 m, more advantageously not greater than 6.0 m, and preferably not greater than 5.8 m.

The thickness of the belt can be at least 1.5 mm, more preferably at least 2.0 mm, and most preferably equal to or more than 3 mm. Thus, it is possible to obtain suitable strength as well as e.g., arrange a reinforcing structure, such as yarns, into the belt. Furthermore, the thickness of the belt can be equal or less than 7 mm, more preferably equal to or less than 5 mm, and most preferably equal to or less than 4 mm, for example in a range of 2.5 mm-5 mm. Said thickness together with materials of the belt can provide good strength properties for the belt.

Body of the Belt

Preferably, the belt 10 comprises an elastic body which has a capacity to reassume its initial shape after being compressed. The belt 10 preferably comprises an elastomer material as its main raw material. The belt 10 can comprise an elastic body 15 in order to have a good elasticity. In this application, the term "elasticity" refers to an ability of the belt to return to its original shape after stretching or pressing.

The belt 10 can be made of materials, suitable for paper, board, pulp, and tissue machines, which do not harm the wire or the fiber web, and which have suitable stretching and strength properties.

The body can comprise or consist of polymer(s). The body 15 may comprise or consist of elastomer material. The elastomer material is preferably the main raw material of the belt.

The body may comprise polyurethane, including the modified polyurethane. At least the outermost surface of the body comprises the modified polyurethane comprising polydialkylsiloxane. Preferably, the elastic body contains primarily polyurethane. Advantageously, the belt comprises at least 50 wt.-%, more advantageously at least 70 wt.-%, and preferably at least 80 wt.-% polyurethane, calculated from the total weight of the belt. Polyurethane may improve the properties of the belt, such as elasticity and bendability, and be particularly suitable for use in combination with the shoe press and the sleeve roll. Thus, the polyurethane may be used to obtain good strength and elasticity properties; hence, the belt may be able to stretch and bend during operating hours without breaking. Further, the modified polyurethane may be particularly suitable in order to lower friction of the outer surface of the belt. Furthermore, the belt may comprise equal to or less than 99.9 wt.-%, more preferably equal to or less than 97 wt.-%, or equal to or less than 95 wt.-% polyurethane, calculated from the total weight of the belt. For example, e.g., reinforcing structure may comprise other material(s).

The body of the belt may have layer(s) composed of polyurethane having a specific composition and hardness, and having excellent physical properties of crack resistance, abrasion resistance, and bending fatigue resistance. At least the outermost layer of the body further comprises the modified polyurethane, thus, an abrasion resistance may be significantly improved.

Producing the Modified Polyurethane

The modified polyurethane comprises a polyurethane matrix covalently bonded with a polydialkylsiloxane.

A polydialkylsiloxane having at least one functional group is a polymer having a structure containing e.g. carbon and silicon, wherein at least one functional group, such as OH-group, is added into the polymer.

Methods for manufacturing polyurethane are known to a person skilled in the art. The manufacturing process of polyurethane may be based on a method of the prior art.

The polyurethane may be made by mixing a urethane pre-polymer having terminal isocyanate groups, with a chain extender, preferably a chain extender comprising amine groups ($HN_2$—), OH groups, or mixtures of these.

The modified polyurethane may be produced by using raw materials of prior art together with a polydialkylsiloxane having at least one functional group, hence, allowing the functional group of the polydialkylsiloxane to react with NCO group of the polyurethane matrix.

Thus, in an embodiment, the polydialkylsiloxane having at least one functional group can be mixed with other raw materials of the modified polyurethane in order to form the modified polyurethane, the modified polyurethane comprising polyurethane matrix which has a covalent bond with polydialkylsiloxane.

The polydialkylsiloxane having at least one functional group may have the following structure:

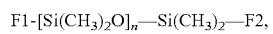

F1-[Si($CH_3$)$_2$O]$_n$—Si($CH_3$)$_2$—F2, wherein n is a number of repeating Si($CH_3$)$_2$O units, and at least one of F1 and F2 comprises or consists of a functional group.

F1 may comprise NCO, or OH or $NH_2$, and F2 may comprise NCO or OH or $NH_2$ or H. The at least one functional group of the polydialkylsiloxane can react with an NCO group in order to form the modified polyurethane. If the at least one functional group of the polydialkylsiloxane comprises NCO, the produced modified polyurethane may have some poorer properties than if the at least one functional group comprises OH or $NH_2$. Thus, preferably, F1 comprises OH or $NH_2$, and F2 is OH or $NH_2$ or H.

Hydroxy terminated polydimethylsiloxanes, and amino-terminated polydimethylsiloxanes has e.g., different reaction rate, i.e., the speed at which the chemical reaction proceeds, which may cause different properties for the modified polyurethane. The hydroxy terminated polydimethylsiloxane is a reactive polydimethylsiloxane having OH-group. Thus, in the belt, the polydimethylsiloxane may be firmly attached to the polyurethane matrix. This solution can reduce friction between the belt and a paper machine fabric, which can result a longer life of the belt compared to other belts. Thus, most preferably F1 comprises OH, and F2 is hydrogen or comprises OH.

In an embodiment, the polydialkylsiloxane having at least one functional group is a hydroxy terminated polydimethylsiloxane having the following structure:

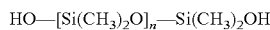

wherein n is the number of repeating Si(CH$_3$)$_2$O units.

The OH-group of the polydimethylsiloxane can react with the NCO-group during the manufacturing process of the modified polyurethane and, hence, form a covalent bond with a polyurethane matrix.

It was surprisingly found out that polydialkylsiloxanes can form a covalent bond with NCO-groups so that the resulted material can have suitable properties for the belt while reducing a friction between the belt and a paper machine fabric, such as a wire or a felt.

A fraction of the functional groups, such as OH-groups, has an effect on properties of the formed modified polyurethane and, hence, on properties of the formed belt.

The polydialkylsiloxane may comprise F1-[Si(CH$_3$)$_2$O]$_n$—Si(CH$_3$)$_2$—F2 polymer with a functional group content in a range between 0.2 mol-% and 4 mol-%, preferably in a range between 0.5 mol-% and 3 mol-%, more preferably in a range between 0.8 mol-% and 2.2 mol-%, and most preferably in a range between 1 mol-% and 2 mol-%. Thanks to said covalent bond between the polyurethane matrix and the polydialkylsiloxane, the polydialkylsiloxane can stay firmly attached to the polyurethane over a time. Further, polydialkylsiloxane having a such fraction can effectively react with NCO-groups of polyurethane in order to form a covalent bond between the polydialkylsiloxane and the polyurethane. Further, the formed modified polyurethane can reduce friction efficiently.

In an advantageous embodiment, the hydroxy terminated polydialkylsiloxane comprises HO—[Si(CH$_3$)$_2$O]$_n$—Si(CH$_3$)$_2$—OH polymer with OH content in a range between 0.2 mol-% and 4 mol-%, preferably in a range between 0.5 mol-% and 3 mol-%, more preferably in a range between 0.8 mol-% and 2.2 mol-%, and most preferably in a range between 1 mol-% and 2 mol-%. Thanks to said covalent bond between the polyurethane and the polydialkylsiloxane, a stable electronic configuration can be formed. Thus, the polydialkylsiloxane can stay firmly attached to the polyurethane over a time. Further, polydialkylsiloxane having a such fraction of OH-groups can effectively react with NCO-groups of polyurethane in order to form a covalent bond between the polydialkylsiloxane and the polyurethane. Further, the formed modified polyurethane can be able to reduce friction efficiently.

In an embodiment, viscosity of the polydialkylsiloxane having at least one functional group may be in a range between 20 cst and 750 cst. This may improve easiness of the manufacturing process.

Thanks to the reactive polydialkylsiloxane, functional group of the polydialkylsiloxane can react with an isocyanate (—NCO) group during manufacturing process of a polyurethane. Thus, the polydialkylsiloxane can be attached to the polyurethane matrix with a covalent bond. Thus, the added polydialkylsiloxane may not interfere with adhesion between polyurethane layers even if the belt comprises more than one polyurethane layer. Further, the polydialkylsiloxane can stay evenly distributed in the outer surface of the belt.

The number n of the repeating Si(CH$_3$)$_2$O— units in the hydroxy terminated polydialkylsiloxane may be in a range between 30 and 200, preferably in a range between 50 and 160, more preferably in a range between 60 and 130, and most preferably in a range between 70 and 100. Typically, said number of the repeating units does not change during manufacturing process of the modified polyurethane. Thus, the polydialkylsiloxane in the modified polyurethane can have the same number of repeating units as the polydialkylsiloxane applied into the manufacturing process of the modified polyurethane. Thanks to the number of the repeating unit, processability of the material can be improved.

Thanks to the polydialkylsiloxane in the modified polyurethane, it is possible to reduce friction between the belt and a wire/felt up to 30%, compared to belts without the polydialkylsiloxane.

Polydialkylsiloxane in the Body of the Belt

The body of the belt comprises the modified polyurethane.

At least the outer surface of the body of the belt comprises the modified polyurethane comprising polyurethane matrix which has a covalent bond with a polydialkylsiloxane.

The body may comprise one or more than one layer. The body comprises at least an outer layer forming at least the outer surface of the body.

A thickness of the outer layer of the body comprising the modified polyurethane can be equal to or less than a thickness of the body of the belt.

In an embodiment, the body of the belt at least essentially consists of the modified polyurethane comprising the polydialkylsiloxane.

The outer layer of the body, comprising the modified polyurethane, may have a thickness of equal to or more than 0.5 mm, preferably equal to or more than 1 mm, more preferably equal to or more than 1.5 mm, most preferably equal to or more than 1.8 mm, determined as a depth from the outer surface of the body of the belt. Thus, it is possible to reduce wear of the belt. The smaller thickness of 0.5 mm can be particularly suitable for reducing friction between the belt and a wire/felt during start-up of the belt. The greater thickness of equal to or more than 1.0 mm, preferably equal to or more than 1.5 mm, can be suitable for reducing wear of the belt during usage of the belt, when the belt has started to wear.

The outer layer of the body comprising the modified polyurethane may have a thickness of equal to or less than a thickness of the body of the belt, preferably thickness of equal to or less than 3 mm, more preferably equal to or less than 2.5 mm, and most preferably equal to or less than 2.2 mm, determined as a depth from the outer surface of the body of the belt. Thus, it is possible to reduce wear of the belt cost-efficiently. Further, polydialkylsiloxane may not have many positive effects in the middle of the belt.

An amount of the polydialkylsiloxane in the modified polyurethane has an effect on properties of the modified polyurethane. Amount of the polydialkylsiloxane may be in a range between 0.5 wt. % and 3 wt. %, preferably in a range between 0.8 wt. % and 2.7 wt. %, more preferably in a range between 1.0 wt.-% and 2.5 wt. %, and most preferably in a range between 1.2 wt.-% and 2.0 wt. %, determined from the total weight of the modified polyurethane. The technical effect is that said total amount of polydialkylsiloxane in the formed modified polyurethane can substantially reduce friction between the belt and a wire or felt in use, without affecting too much other properties of the belt. Further, too many unbonded functional groups, such as OH-groups, in the modified polyurethane may not be advantageous for the product.

The amount of the polydialkylsiloxane may be in a range between 0.5 wt. %-3 wt. %, preferably in a range between 0.8 wt. % and 2.7 wt. %, more preferably in a range between 1.0 wt.-% and 2.5 wt. %, and most preferably in a range between 1.2 wt.-% and 2.0 wt. %, determined from the total weight of the outer layer of the belt. Thus, a friction between the outer surface of the belt and a wire or a felt can be decreased.

The molecular weight (MW, g/mol) of the hydroxy terminated polydialkylsiloxane may vary. The hydroxy terminated polydialkylsiloxane may have a molecular weight (MW) of more than 1500 g/mol, such as in a range between 1500 g/mol and 8000 g/mol. The molecular weight of the hydroxy terminated polydialkylsiloxane is preferably from about 1500 g/mol to 6000 g/mol, more preferably in a range from about 2000 g/mol to about 5500, and most preferably in a range between 2500 g/mol and 5000 g/mol. A molecular weight of the polydialkylsiloxane can have an effect on properties of the modified polyurethane. Further, molecular weight of the polydialkylsiloxane can have an effect on the manufacturing process.

As discussed, the body of the belt comprises said modified polyurethane, wherein the polydialkylsiloxane has a covalent bond with a polyurethane matrix. Addition of the polydialkylsiloxane can substantially improve abrasion resistance of the belt. The polydialkylsiloxane is preferably a polydimethylsiloxane.

Friction between a belt and a paper machine fabric, particularly if the belt has a substantially smooth outer surface, can be substantially high. Thus, the belt may start to wear too quickly. Thanks to the modified polyurethane comprising polyurethane matrix having a covalent bond with the polydialkylsiloxane, friction between the belt and a wire/felt can be reduced. Thus, wear of the belt and the wire/felt can be reduced.

Outer Surface of the Belt

The outer surface 12 of the belt comprises or consists of the modified polyurethane. The outer surface 12 of the body of the belt can be formed of the modified polyurethane.

The modified polyurethane can be particularly advantageous with belts having a smooth outer surface because such belts may otherwise have high friction between the belt and a wire/felt. Thus, advantageously, the belt comprising the modified polyurethane has a smooth outer surface. The belt having the smooth outer surface may not have grooves, nor patterning, having a depth of more than 0.4 mm. Particularly, a smooth surface may not have any area of greater than 10 mm² having a depth of more than 0.4 mm.

The outer surface 12 of the belt may comprise a slight patterning, i.e. so-called buffing. The depth of the buffing on the outer surface 12 of the belt 10 may be, for example, 0 to 50 µm, or 3 to 30 µm. A suitable roughness of the outer surface of the belt can have advantageous effects on its action together with the paper machine fabric, particularly with the modified polyurethane.

In an embodiment, the outer surface 12 of the belt comprises several parallel grooves 50, as well as ridges between them, as shown e.g., in FIGS. 3B-C in order to improve dewatering properties of the belt 10. The technical effect is to obtain improved water removal rate. The depth of a groove may be more than 0.4 mm, and preferably equal to or less than 2.0 mm, such as in a range between 0.5 mm and 1.5 mm, measured from the deepest point of the dewatering groove. The width of the dewatering groove 50 may be equal to or more than 0.5 mm and not greater than 2.0 mm. The distance between the central lines of two parallel adjacent dewatering grooves 50 may be at least 1.5 mm and not greater than 7.0 mm. The total water volume of the dewatering grooves 50 may be e.g., between 100 and 800 g/m². The number of dewatering grooves 50 may be at least 140/m, more advantageously at least 200/m and advantageously not greater than 670/m. With the above-mentioned features of the dewatering groove 50 water can be removed from the web more efficiently via said dewatering groove 50. These benefits are typically realized the better, the more of the above-mentioned features are implemented in the belt 10. The grooves may be formed by the body material as shown in FIG. 3B. Alternatively, the outer surface 12 of the belt can be substantially smooth as shown e.g., in FIG. 3A.

In an embodiment, the grooves may be at least partially formed by reinforcing structure, as shown in FIG. 3C. By arranging some yarns near the surface of the belt, it is possible to further decrease wear of the belt. By arranging the neutral axis of the belt near the outer surface of the belt, the outer surface of the belt can wear less. If the outer surface of the belt comprises the yarns, they are typically arranged in the travel direction of the belt. However, as discussed, the outer surface 12 of the belt can be substantially smooth as shown e.g., in FIG. 3A. Thus, in an embodiment, the body 15 and/or the reinforcing structure 30 may not form said grooves 50.

Inner Surface of the Belt

The belt 10 has an inner surface 11. The inner surface of the body may form the inner surface of the belt.

The inner surface 11 of the belt can be substantially smooth. The inner surface may or may not comprise a slight patterning, i.e., so-called buffing. The depth of the buffing may be, for example, 0 to 15 µm, preferably from 0.01 µm to 4.00 µm, and more preferably in a range between 0.1 µm and 2 µm. Said roughness, i.e., buffing, of the inner surface of the belt may have a substantial effect on the durability of the belt. For example, in a case of broken uniformity of the lubricating oil film, the belt having an inner surface 11 with a buffing may not be as easily damaged as a belt having a smooth inner surface. In other words, without the buffing of the inner surface 11, the belt might, after breaking of the uniformity of the lubricating oil film, have a strongly decelerating effect due to the smooth surfaces, which may result in a permanent deformation in the belt. In an embodiment, the inner surface 11 comprises the modified polyurethane.

Reinforcing Structure of the Belt

The belt may comprise a reinforcing structure. The reinforcing structure can be a support structure supporting the body. The elasticity of the belt may need to be substantially high, hence, the reinforcing structure should not decrease the elasticity of the belt too much.

The reinforcing structure may comprise yarns. The term "yarn" refers to a long structure, which has relatively small cross section. The yarn can be composed of fibers and/or filaments, with or without twist. The yarn can be multiple plied yarn. The yarn can be based on synthetic polymer(s). The term "filament" refers to a fiber of great length.

The belt may have several yarns arranged in at least two directions, i.e., the first direction and the second direction. The first direction can be parallel or substantially parallel to an axis of rotation of the belt and the second direction can be parallel or substantially parallel to a travel direction of the belt.

The yarns in different layers 31, 32 may be either in contact with or bonded to the yarns of the next layer, or they may be spaced from each other. Preferably, the reinforcing yarn layers 31, 32 on top of each other are separated from each other. Thus, the yarn layers do not have to be fastened to each other or bound to each other in any way. Alternatively, the second yarns may be bonded to the first yarns. The first yarns bonded to the second yarns can improve strength properties of the reinforcing structure.

The yarns may be embedded in the elastic body. Thus, the yarns may be fully surrounded by the material of the body. In an embodiment, some yarns can be arranged, at least partially, on the elastic body of the belt. Thus, in this embodiment, some of the yarns may not be fully surrounded by the material of the body. The technical effect is that the neutral axis of the belt can be near the outer surface of the belt. This can reduce wear of the belt and provide a longer life for the belt.

The yarns may comprise synthetic fibers having high strength, high modulus, and high elastic modulus. The yarns can comprise or consist of at least one of polyamide (PA), e.g., nylon, polypropylene (PP), polyethylene (PE), rayon, viscose, polyester such as polyethylene terephthalate (PET), polyvinyl alcohol (PVA), polyaramide, polyphenylene sulfide (PPS), liquid crystal plastic (LCP), polyimide, and polyether ether ketone (PEEK). The yarns comprising or consisting of the above-mentioned materials can stiffen the belt, but still allow the necessary level of bending and stretching of the belt.

An Example of a Manufacturing Method

A process for producing a body of a belt can comprise:
producing a modified polyurethane by adding a polydialkylsiloxane having at least one functional group to a manufacturing process of a polyurethane in order to obtain the modified polyurethane, which modified polyurethane comprises a polyurethane matrix having a covalent bond with polydialkylsiloxane, and
forming the body of the belt, wherein at least an outer surface of the body comprises the modified polyurethane.

The belt can be formed in manners known per se. The belt may be manufactured, e.g., by
providing several support yarns,
shaping a body for a belt by casting an elastomer material comprising polyurethane against a mold surface, wherein at least an outer surface of the body comprises the modified polyurethane,
curing the material; and
optionally, providing the outer surface of the frame with several grooves.

The belt can be intended to be installed on a sleeve roll or a shoe press of a board machine, a paper machine, a pulp machine, or a tissue machine. The belt may further comprise e.g., a plurality of attaching points 60 of the belt for an installation of the belt.

Example 1

An effect of the modified polyurethane on friction was tested during experimental tests. Amounts of polydimethylsiloxane varied in the modified polyurethane samples as shown in Table 1.

Friction of every sample was measured with a same method by using the Alwetron TCT-20 device having an assembly according to standard ASTM D1894. The values were determined by using a weight of 52 N on a circular sample having the same area of 3420 mm². A fabric (a wet wire) was placed and fixed below the sample. For each sample, the back side of the wire was directly in contact with the sample during measurements.

The results are shown in Table 1. As can be seen, modified polyurethane having PDSM content of greater than 0 wt. % gave improved effect on friction, and an amount of PDMS in a range between 1 wt. % and 2 wt. % had the greatest effect on friction.

TABLE 1

|  | Friction (N) | Friction Coefficient |
| --- | --- | --- |
| PDMS 0.0 w-% in PU | 29.1 | 0.56 |
| PDMS 1.2 w-% in PU | 25.3 | 0.49 |
| PDMS 1.75 w-% in PU | 19.4 | 0.37 |
| PDMS 2.0 w-% in PU | 25.4 | 0.49 |
| PDMS 2.5 w-% in PU | 28.0 | 0.54 |

In Table 1, the term "PU" refers to (modified) polyurethane.

The invention has been described with the aid of illustrations and examples. The invention is not limited solely to the above presented embodiments but may be modified within the scope of the appended claims.

The invention claimed is:

1. A belt for a paper, board, pulp, or tissue machine, wherein the belt comprises:
a body comprising an inner surface and an outer surface;
wherein the body comprises an outer layer forming the outer surface of the body, the outer layer having a thickness of at least 0.5 mm; and
wherein the outer layer forming the outer surface of the body comprises a modified polyurethane, the modified polyurethane comprising a polyurethane matrix having a covalent bond with a polydialkylsiloxane.

2. The belt of claim 1 wherein the polydialkylsiloxane is polydimethylsiloxane having the following repeating unit:

wherein n is a number of repeating units; and
wherein n is between 30 and 150.

3. The belt of claim 1 wherein the body has a thickness and wherein the outer layer has a thickness the same or less than the thickness of the body.

4. The belt of claim 1 wherein the outer layer of the body has a thickness between 0.5 mm and 3 mm.

5. The belt of claim 4 wherein the outer layer of the body has a thickness between 1 mm and 2.5 mm.

6. The belt of claim 1 wherein the modified polyurethane has a total weight, and wherein an amount of the polydialkylsiloxane is between 0.8 wt. %-3 wt. % of the total weight of the modified polyurethane.

7. The belt of claim 6 wherein an amount of the polydialkylsiloxane is between 1.0 wt.-% and 2.5 wt. %.

8. The belt of claim 1 wherein the outer surface of the body is smooth.

9. The belt of claim 1 further comprises grooves formed in the outer surface of the body.

10. The belt of claim 1 wherein the body further comprises an inner layer, which inner layer has a thickness and forms an inner surface of the body, wherein the inner surface is free of the polydialkylsiloxane.

11. The belt of claim 1 wherein the polydialkylsiloxane has a molecular weight (MW) of more than 1500 g/mol.

12. The belt of claim 1 wherein the polydialkylsiloxane has a molecular weight (MW) between 1500 to 6000 g/mol.

13. A belt for a sleeve roll or shoe press wherein the belt comprises:
a body comprising an inner surface and an outer surface;
wherein the body comprises an outer layer forming the outer surface of the body, the outer layer having a thickness of at least 0.5 mm, and wherein the outer layer forming the outer surface of the body comprises a modified polyurethane, the modified polyurethane comprising a polyurethane matrix having a covalent bond with a polydialkylsiloxane wherein the polydialkylsiloxane is between 1.0 wt.-% and 2.5 wt. %.

* * * * *